UNITED STATES PATENT OFFICE.

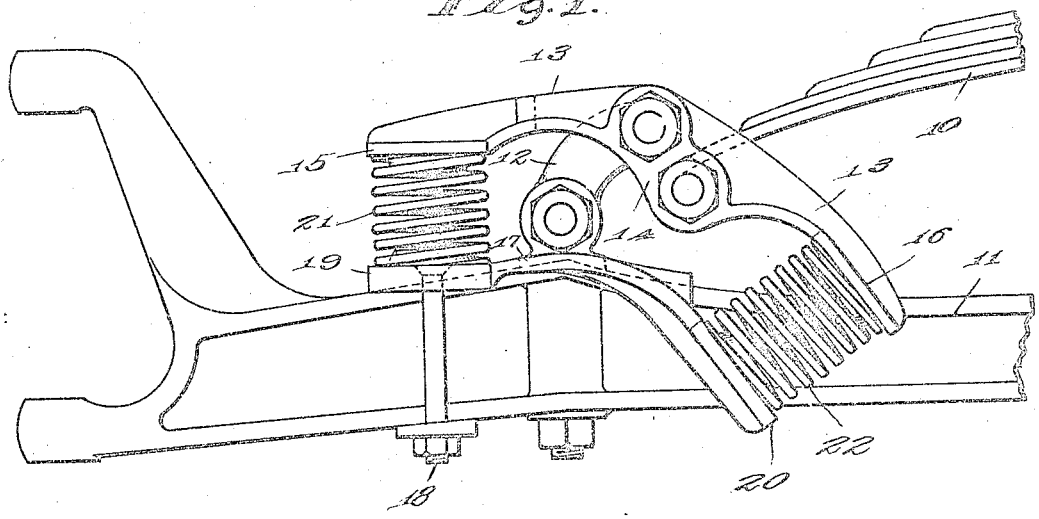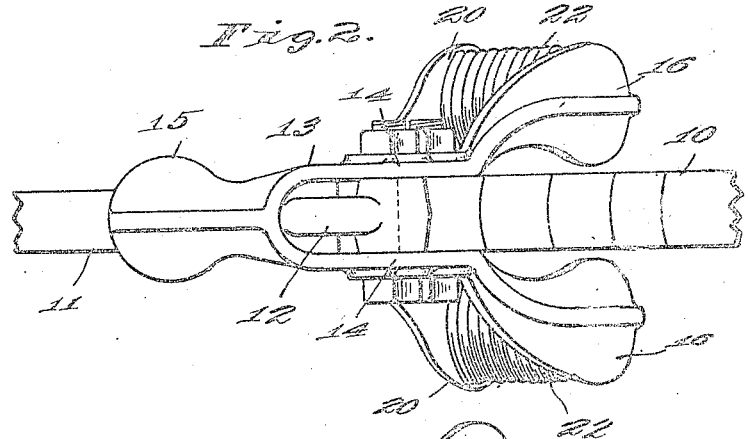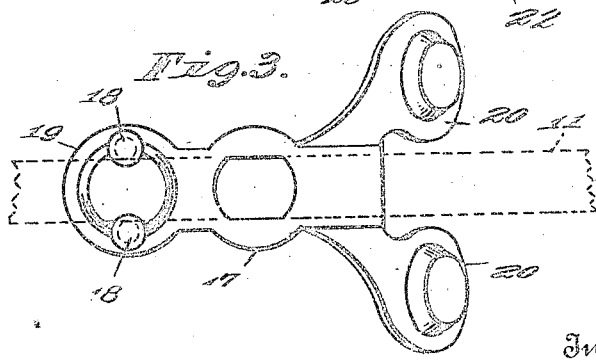

LOUIE H. OBERREICH, OF INDIANAPOLIS, INDIANA.

SHOCK-ABSORBER.

1,372,825.

Specification of Letters Patent.   Patented Mar. 29, 1921.

Application filed July 11, 1919.   Serial No. 310,143.

*To all whom it may concern:*

Be it known that I, LOUIE H. OBERREICH, a citizen of the United States, residing at Indianapolis, in the county of Marion and State of Indiana, have invented a new and useful Shock-Absorber, of which the following is a specification.

It is the object of my invention to provide a simple shock absorber, which can be applied to Ford cars without requiring any material change in the spring and axle structure thereof, which eliminates the necessity for any link between the perch and the main spring in addition to the shock-absorber lever itself, which takes care of both direct and rebound shocks, which resiliently opposes side-sway, and which will allow the vehicle to continue in operation even though some or all of the shock-absorber springs are broken or removed.

The accompanying drawing illustrates my invention: Figure 1 is a fragmentary elevation of a front axle and spring of an automobile, equipped with a shock absorber embodying my invention; Fig. 2 is a plan of the structure shown in Fig. 1; and Fig. 3 is a plan of the saddle which is mounted on the axle.

The main spring 10 and the front axle 11 are of standard Ford construction, and the end of the spring 10 is supported from the standard perch 12, with which the axle is provided and which projects upward and inward from the axle. The end of the spring 10 and the end of the perch 12 are both provided with eyes. None of this is at all changed from standard. In the standard construction, however, the eyes of the perch and of the main spring are connected by a shackle or link. I remove that shackle or link, and in place of it provide a lever 13, which has a link portion 14 substantially corresponding to the standard shackle or link and pivotally connected to both such eyes. This link portion is substantially normal to the main spring 10 at the point of connection thereto, so as to allow the link portion to swing back and forth as the main spring 10 spreads or contracts in its action. The lever 13 also has an outwardly extending arm provided with a downwardly facing spring-seat 15, and a pair of inwardly and (as shown) downwardly projecting arms provided with obliquely downwardly facing spring-seats 16. The inwardly projecting arms are continuations of the link portion 14, which is in duplicate by bifurcation of the lever 13 so that its two parts and such inwardly projecting arms receive between them the perch 12 and the end of the spring 10. A saddle member 17, shown in detail in Fig. 3, is mounted on the axle, and is clamped thereupon by suitable bolts 18. This saddle 17, through which the perch projects, has spring-seats 19 and 20 opposing the spring-seats 15 and 16. The spring-seats 20 are on a pair of arms of the saddle, which arms project obliquely downward along the sides of the axle 11. Between the spring-seats 15 and 19 is a compression spring 21; and between the pair of spring-seats 16 and the pair of spring-seats 20 are a pair of compression springs 22. The obliqueness of the spring-seats 16 and 20 and of the springs 22 is not essential, but is a convenient construction.

In operation: When the spring 10 is pushed down, it spreads as in the standard construction, and turns the lever 13 in the direction to depress the spring-seats 16 and compress the springs 20. On the rebound, however, the lever 13 turns in the opposite direction, and the springs 22 expand; and this movement of the lever 13 depresses the spring-seat 15 and compresses the spring 21. Thus the springs 22 resiliently take the main shock, and the spring 21 resiliently takes the rebound; and both the springs 22 and the spring 21, when fully compressed, act to positively limit the movement of the lever 13. In addition, when there is any side-sway of the vehicle body, tending to move the main spring 10 lengthwise, such movement of the spring 10 turns oppositely the levers 13 with which its ends are connected, so that the spring 21 associated with one such lever and the springs 22 associated with the other such lever are compressed. This reduces such side-sway, by resilient opposition, and so reduces the effect of such side-sway on the car body. Furthermore, because of the arrangement of the lever 13 so that it has its link portion 14 and there is no additional link in the construction, the device will still operate, with the link portion 14 of the lever 13 serving merely as a link, in case the springs 21 and 22 or some of them are removed for any cause or are broken. Thus in case of accident to these springs or of breakage of the lever 13 at any point except the link portion 14, the device is still operative as a support for the car body, though without the resilient shock-absorber effect which is obtained when the springs 21 and 22 are effective.

I claim as my invention:

1. In combination with the main spring, axle, and perch of an automobile, a lever having a link portion which is directly pivotally connected to the perch and to the main spring and which is substantially normal to the main spring, and springs acting in both directions on such lever to resiliently oppose the turning thereof in either direction.

2. In combination with the main spring, axle, and perch of an automobile, a lever directly pivotally connected to both the perch and the main spring, and a plurality of separate springs acting between opposite ends of said lever and the axle to oppose its movement in either direction.

3. In combination with the main spring and axle of an automobile, a lever directly pivoted to points normally fixed with relation to said spring and said axle respectively with the line between said two points substantially normal to the main spring, and springs opposing the movement of said lever in either direction.

4. In combination with the main spring, axle, and perch of an automobile, a lever bifurcated at one end and located astride and directly pivotally connected to said perch and the end of said main spring, a pair of springs acting between the bifurcated end of said lever and said axle, and a separate spring acting between the other end of said lever and said axle and acting on said lever oppositely to said pair of springs.

5. In combination with the main spring, axle, and perch of an automobile, a lever having a link portion which is directly pivotally connected to the perch and to the main spring and which is substantially normal to the main spring, a spring acting on said lever to oppose the movement of the main spring toward the axle, and means for limiting the movement of said lever occurring upon rebound of the main spring away from the axle.

6. In combination with the main spring and axle of an automobile, a lever directly pivoted to points normally fixed with relation to said spring and said axle respectively with the line between said two points substantially normal to the main spring, a spring acting on said lever to oppose the movement of the main spring toward the axle, and means for limiting the movement of said lever occurring upon rebound of the main spring away from the axle.

7. In combination with the main spring, axle, and perch of an automobile, a lever bifurcated at one end and located astride and directly pivotally connected to said perch and the end of said main spring, a pair of springs acting between the bifurcated end of said lever and said axle, and means for limiting the movement of said lever occurring upon the expansion of said pair of springs.

8. In combination with the main spring, axle, and perch of an automobile, a lever directly pivotally connected to said perch and the end of said main spring, a spring between said lever and the axle to oppose the movement of the lever which occurs when the main spring and axle are forced together, and a separate spring acting between said lever and the axle and opposing the movement of said lever which occurs when the main spring and axle separate.

9. In combination with the main spring and spring support of an automobile, a lever having an intermediate portion arranged for pivotal connection at the ends thereof to said main spring and to said spring support and also having two portions projecting in different directions from said intermediate portion, in combination with springs arranged to act on said two projecting portions.

In witness whereof, I have hereunto set my hand at Indianapolis, Indiana, this ninth day of July, A. D. one thousand nine hundred and nineteen.

LOUIE H. OBERREICH.